US005293633A

United States Patent [19]

Robbins

[11] Patent Number: 5,293,633

[45] **Date of Patent: * Mar. 8, 1994**

[54] APPARATUS AND METHOD FOR PROVIDING DIGITAL AUDIO IN THE CABLE TELEVISION BAND

[75] Inventor: Clyde Robbins, Maple Glen, Pa.

[73] Assignee: General Instrument Corporation, Hatboro, Pa.

[ * ] Notice: The portion of the term of this patent subsequent to Aug. 6, 2008 has been disclaimed.

[21] Appl. No.: 702,018

[22] Filed: May 17, 1991

Related U.S. Application Data

[63] Continuation-in-part of Ser. No. 280,770, Dec. 6, 1988, Pat. No. 5,038,402.

[51] Int. Cl.[5] ......................... H04H 1/02; H04B 5/00; H04N 1/00

[52] U.S. Cl. ....................................... 455/3.1; 455/6.1; 455/72; 381/2; 381/3; 375/17; 348/6; 348/485

[58] Field of Search ................... 455/3.1, 6.1, 6.2, 6.3, 455/42, 45, 72, 130, 188.1; 381/2-3, 14, 29-32, 34; 375/17-18, 25, 29-30, 36, 122; 358/86, 143-144; 370/11-12, 76, 118

[56] References Cited

U.S. PATENT DOCUMENTS

| | | | |
|---|---|---|---|
| 3,471,644 | 10/1969 | Gold et al. | 381/31 |
| 3,586,781 | 6/1971 | Jones | 455/45 |
| 3,696,297 | 10/1972 | Otero | 455/4.2 |
| 3,824,468 | 7/1974 | Zegers et al. | 455/45 |
| 3,860,873 | 1/1975 | Ringstad | 381/3 |
| 4,183,054 | 1/1980 | Patisaul et al. | 358/86 |
| 4,318,125 | 3/1982 | Shutterly | 370/109 |
| 4,379,947 | 4/1983 | Warner | 381/2 |
| 4,567,591 | 1/1986 | Gray et al. | 370/109 |
| 4,586,081 | 4/1986 | St. Arnaud et al. | 381/3 |
| 4,608,456 | 8/1986 | Paik et al. | 381/1 |
| 4,621,282 | 11/1986 | Ahern | 358/86 |
| 4,656,629 | 4/1987 | Kondoh et al. | 370/85 |
| 4,660,193 | 4/1987 | Young et al. | 370/11 |
| 4,684,981 | 8/1987 | Toyoshima et al. | 358/86 |
| 4,688,246 | 8/1987 | Eilers et al. | 380/9 |
| 4,703,480 | 10/1987 | Westall et al. | 381/30 |
| 4,704,727 | 11/1987 | Beard | 381/13 |
| 4,723,285 | 2/1988 | LeRoy et al. | 381/2 |
| 4,750,167 | 6/1988 | Meyer | 381/2 |

(List continued on next page.)

FOREIGN PATENT DOCUMENTS

| | | | |
|---|---|---|---|
| 0144801 | 6/1985 | European Pat. Off. | . |
| 0167773 | 1/1986 | European Pat. Off. | . |
| 0179612 | 4/1986 | European Pat. Off. | . |
| 2164528 | 3/1986 | United Kingdom | . |

OTHER PUBLICATIONS

C. Robbins, "Digital Audio for Cable Television", 1986 NCTA Technical papers, pp. 21-24.
Furuya et al, "Sound Program Digital Transmission System and Equipment," NEC Res. & Dev., Oct. 1980.
Moriya et al, "Digital Transmission System for Stereo Broadcasting", Sci. & Tech. Journal, Dec. 1979.

(List continued on next page.)

*Primary Examiner*—Reinhard J. Eisenzopf
*Assistant Examiner*—Andrew Faile
*Attorney, Agent, or Firm*—Barry R. Lipsitz

[57] ABSTRACT

A method and apparatus are provided for transmitting, receiving, and reproducing digital audio signals as discrete carriers similar to standard FM broadcast signals. An audio signal is digitized using, for example, adaptive delta modulation techniques. Several channels of audio information, such as left and right stereo channels and a second audio program ("SAP") channel can all be digitized and incorporated onto the digital broadcast signal carrier. The digitized audio signal may be modulated using multiphase modulation of the carrier of an FM broadcast band or cable television band signal. A plurality of audio channels may be digitized and transmitted over the airwaves, or over a cable transmission network. Channels of nondigitized audio channels may be interspersed with the digitized audio channels in the Fm broadcast band. Source material for the digitized audio channels may be provided to a cable headend over the cable transmission network in the 5-30 MHz CATV upstream path, and rebroadcast over the cable transmission network in the forward or "downstream" band.

20 Claims, 9 Drawing Sheets

U.S. PATENT DOCUMENTS

| | | | |
|---|---|---|---|
| 4,750,173 | 6/1988 | Bluthgen et al. | 370/118 |
| 4,787,085 | 11/1988 | Suto et al. | 370/110.1 |
| 4,788,675 | 11/1988 | Jones et al. | 370/69.1 |
| 4,803,727 | 2/1989 | Holt et al. | 381/1 |
| 4,821,097 | 4/1989 | Robbins | 358/143 |
| 4,821,260 | 4/1989 | Klank et al. | 381/2 |
| 4,827,515 | 4/1989 | Reich | 381/7 |
| 4,882,773 | 11/1989 | Maloney | 359/182 |
| 4,922,536 | 5/1990 | Hoque | 381/2 |
| 5,038,402 | 8/1991 | Robbins | 455/6.3 |

OTHER PUBLICATIONS

L. Dudek, "Digitale Ubertragung uber FM-Sender im UKW-Band II," Rundfunktechnische Mitteilungen, vol. 29, No. 6, Nov.-Dec. 1985, pp. 292-297.

U. Messerschmid, et al, "Digitaler Horfunk im UKW-Bereich-Modulationsverfahren und Kanalaufteilung, Chancen und Risiken", Rundfunktechnische Mitteilungen, vol. 29, No. 11, Jan.-Feb. 1985, pp. 1-8.

T. Peiler, "Synchrone QPSK-Demodulatoren fur den digitalen Horrundfunk", Rundfunktechnische Mitteilungen, vol. 31, No. 3, May-Jun. 1987, pp. 113-118.

QPSK/FM Receiver

APPARATUS AND METHOD FOR PROVIDING DIGITAL AUDIO IN THE CABLE TELEVISION BAND

This application is a continuation-in-part of commonly owned, copending U.S. patent application Ser. No. 07/280,770 filed Dec. 6, 1988 now U.S. Pat. No. 5,038,402 for "Apparatus and Method for Providing Digital Audio in the FM Broadcast Band".

TECHNICAL FIELD OF THE INVENTION

The present invention relates to audio broadcasting and reception, and more particularly to a method and apparatus for providing high quality digital sound signals within a cable television band.

BACKGROUND OF THE INVENTION

Cable television growth has come from the development of various programming categories and by the technologies which made the delivery of these programs possible. Cable first brought distant TV signals to areas where there was little or no off-air reception. This applies to distant signals and weak signal areas where outdoor antennas are mandatory. The next category to bring major growth to cable was the advent of premium pay services, which became available after the development of reasonable cost satellite delivery systems. After satellite delivery was accepted and became less costly, super stations and cable networks formed another category of programming that has become customary and are often termed "extended basic" services. Franchising and local politics has created a generally unprofitable but necessary category called "local origination". Recently, addressable technology and aggressive marketing have caused "pay-per-view" programming to form another category of programming.

FM (audio) broadcasting over cable has never achieved significant success for two technological reasons: signal quality is poor and there has been no way to collect revenue or control the access to the service.

New digital techniques for the reproduction of sound provide performance that is far superior to analog techniques which have been used in the past. An example of high fidelity sound reproduction using digital techniques can be found in the compact disc technology which has recently enjoyed tremendous success as an alternative to phonograph records and tapes. Digital recording and playback techniques provide reproduction of music that is extremely realistic and free from background noise and distortions which have plagued other high fidelity sound reproduction systems currently in wide scale use.

Commonly owned, U.S Pat. No. 4,821,097, entitled "Apparatus and Method for Providing Digital Audio on the Sound Carrier of a Standard Television Signal", and incorporated herein by reference, discloses a system wherein the FM audio portion of a standard television signal in the TV band is replaced with digital audio. Three digital audio channels are time division multiplexed on the sound carrier, using combined multiphase and AM modulation. The audio signals are digitized using adaptive delta modulation techniques. Video vertical and horizontal framing, as well as the audio carrier phase reference, audio data bit time and frame reference, and various control data is carried using AM modulation. The digital audio information is carried using multiphase modulation. The composite data stream may be serially encrypted to provide security and prevent unauthorized reproduction of the video and/or audio portions of the television signal.

U.S. Pat. No. 4,684,981, entitled "Digital Terminal Address Transmitting for CATV", discloses producing digital signals of up to four different modes for transmission over an unused television channel in an existing cable television transmission line. High quality audio signals may be transmitted and/or data channels or monaural audio signals, all of which may be transmitted over the single cable television transmission line. Cable television channels have approximately a 6 MHz bandwidth, and are transmitted in the TV band which ranges in frequency from 50 MHz (channel 2) to 550 MHz (channel 50).

Any distribution system which transmits digital audio data (such as a cable television system) must be such that the transmitted audio signal does not interfere with millions of radio sets already in existence which use conventional analog sound circuits. Thus, such things as the channel width of 400 kilohertz (KHz) for each channel within the FM broadcast band should not be changed, subject to narrow tolerances.

DISCLOSURE OF THE INVENTION

It is an object of the present invention to provide a method and apparatus for incorporating digitized audio data within a plurality of channels in the standard FM broadcast band and/or in portions of a cable television band in a manner such that the signal will be recoverable for reproduction of the transmitted audio program on FM radio receivers coupled to a cable system and having appropriate digital data receiving circuitry.

In accordance with the present invention, a method and apparatus are provided for transmitting, receiving, and reproducing digital audio signals as discrete carriers frequency allocated as standard FM broadcast signals or as narrowband signals in nontelevision signal portions of the cable frequency spectrum. An audio signal is digitized using, for example, adaptive delta modulation techniques. Several channels of audio information, such as left and right stereo channels or four voice mono channels can all be digitized and incorporated onto the digital carrier in the FM broadcast or cable television band. The digitized audio signal is modulated using multiphase, multiamplitude or multifrequency modulation of the carrier in the FM broadcast or cable television band.

The 400 KHz spacing of digital carriers in the FM band allows 50 channels of stereo digital quality audio, addressable and encrypted. In a local service area, the FCC spaces FM stations 800 KHz apart, meaning that there are a maximum of 25 local FM broadcasters in the most dense markets.

A bandwidth efficient system would use Dolby ADM and would allow data carriers at 400 KHz spacing. This spacing is the same as normal broadcast FM. This would allow up to 50 channels in the FM band. The digital channels could be intermixed (staggered) with regular FM channels. There is also the possibility for broadcast (wireless) application. Another alternative would be to transmit 44 KHz sampled 16 bit linear PCM (Compact Disc Format) spaced at 1.2 MHz between channels, allowing 16 channels in the FM band.

Additional narrowband 400 KHz channels can be provided in other portions of the cable television band, e.g., from 45 MHz to 54 MHz which comprises an area of the cable television spectrum below television channel two and partially within the guard band between the forward transmission path from the cable system headend (approximately 50 MHz and above) and the return path to the headend (5 MHz to 30 MHz). This area of the cable television spectrum has been largely unused due to the enormous group delay caused by the filtering necessary to separate the forward and return paths. Such delay, which affects both the amplitude and phase of signals propagating in the 45 MHz to 54 MHz subband, renders this subband unacceptable for the transmission of conventional wideband signals about 2 MHz in bandwidth. The group delay adversely affects both digital and analog signals.

A Dolby system for use in digitizing the audio data can be built at low cost. From a marketing standpoint, it is recommended that discrete carriers be used rather than full video channels with time division multiplexing (TDM). This results in lower cost, more acceptable use of spectrum to the cable operator and more robust performance.

When the present invention is used in conjunction with a cable television system, three primary components are used. These are the addressable controller (also referred to as "headend controller"), the headend encoder, and the subscriber converter (also known as the "subscriber terminal"). Both the addressable controller and encoder are present at the headend from which the cable television signals are sent by the cable system operator. The addressable controller controls all subscriber terminals in the cable television system, controls the encoders/decoders associated with the system, configures scrambling modes, service codes, and encryption keys, and orchestrates the dissemination of all decryption keys. The encoder of the present invention is a headend device consisting of a number of subcomponents including an audio digitizer, audio scrambler, tag insertion logic, addressable controller interface logic, and modulator circuitry.

The subscriber converter is a device located at each subscriber's residence and contains an RF converter module, demodulator, addressable control interface logic, subscriber interface logic, audio decryptor and digital to analog ("D/A") converter.

Control data communicated over the FM path time division multiplexed with the digital audio data between the headend controller and the encoder typically includes a signature used to protect sensitive information communicated over the path, tag and audio encryption keys, key usage identifiers, sampling mode data, audio service code, and price and morality rating data. Data which pertains to the digital audio service and is sent to the subscriber terminal over the FM path includes a signature used to protect sensitive information communication over the path, tag and audio decryption keys, and authorization information.

The following commonly-used abbreviations may be used throughout this application: kilohertz (KHz), megahertz (MHz), frequency modulation (FM), television (TV), adaptive delta modulation (ADM), amplitude modulation (AM), cable television (CATV), pulse code modulation (PCM), time division multiplex (TDM), pulse modulation (PM), pulse amplitude modulation (PAM), pulse width modulation (PWM), frequency division multiplexing (FDM), quadrature phase shift keying (QPSK), radio frequency (RF), audio frequency (AF), direct current (DC), and Federal Communications Commission (FCC).

Other objects, features and advantages of the invention will become apparent in light of the following description thereof.

DETAILED DESCRIPTION OF THE INVENTION

Digital information such as digitized audio, addressing data, and auxiliary data may be combined together to form a composite digital data stream. This digital signal may then be modulated on a carrier for transmission. The modulation may cause amplitude, phase, or frequency variation of the carrier. In order to maintain channel spacing similar to previously established analog transmission standards, multilevel (AM), multiphase (PM, i.e., QPSK) or multifrequency (FM) must be used. QPSK or eight frequency FM are approaches that when combined with an efficient digital audio sampling system, such as Dolby ADM, can allow coexistent digital and analog modulated carriers in the FM broadcast band at the normal frequency allocations. QPSK is the preferred transmission modulation means, as its signal to interference ratio required for operation without data errors is less than with eight level FM.

Figure 1:
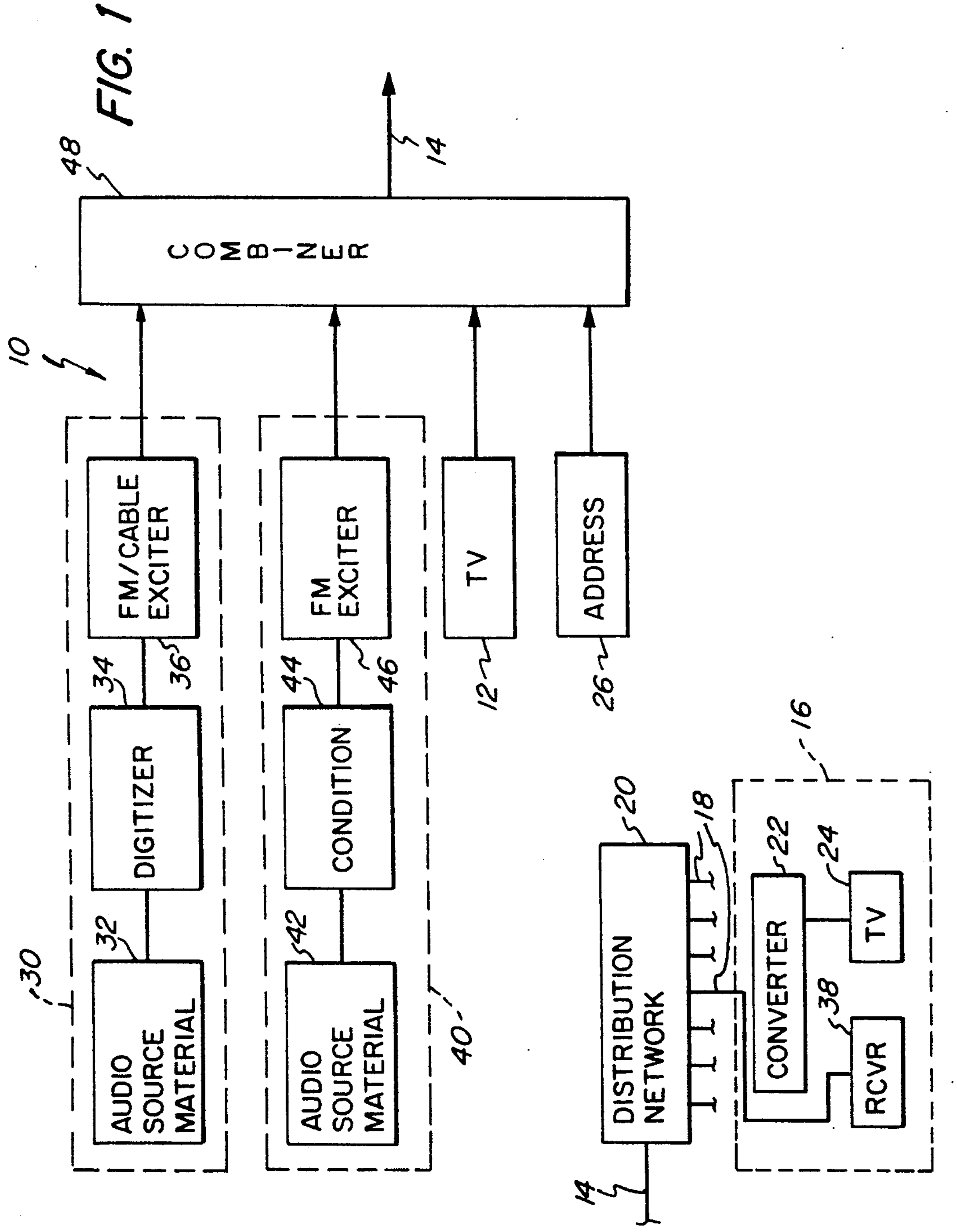
FIG. 1 is a schematic block diagram of the digital audio system of this invention.

FIG. 1 shows the major elements of the digital audio system of this invention, portions of which will be described in greater detail hereinafter. As described herein, the digital audio system is applied to a cable television network, but it will be evident that the techniques described are applicable to wireless broadcast of digital audio.

At the headend, or cable transmission center 10, a plurality of television channel transmissions 12 are provided for distribution over a cable transmission line 14, according to known techniques. Further, according to known techniques, a plurality of subscribers 16 (one shown) are connected, each by a cable drop 18, to a distribution network 20. Each subscriber is provided with either a cable-ready television, capable of tuning in excess of 100 TV channels, or is provided with a converter 22 which converts a selected one of the hundred or so TV channels to a preselected channel, such as channel 3, which may be received by an ordinary, non-cable-ready television set 24. It is further known to provide "special" channels within the band of television channels that may only be viewed by a subscriber on a special basis. To this end, digital address signals 26 are provided on the cable 14, and the converter 22 either permits or restricts viewing the special TV channels in response to the digital address signals, again according to known techniques.

According to the invention, audio-only source material is also provided over the cable 14 in the following manner. A channel 30 of audio source material 32 is provided to a digitizer 34 which converts the source material into digital format. Such conversion of the audio source material to digitized audio may be performed according to a variety of known techniques. The digitized audio source material is provided to an FM/cable band exciter 36 which provides the digitized audio source material as a radio frequency (RF) signal to the cable 14. In accordance with the present invention, the RF signal is provided either in the FM radio broadcast band or in a selected portion of the cable television band, such as the 45 MHz to 54 MHz subband below television channel two. One channel 30 is illustrated, but several channels may be provided. Each channel may contain stereo program material. The RF output of each channel 30 occupies up to 400 kilohertz (KHz), either in the standard FM broadcast band which ranges typically from 88–108 megahertz (MHz), or in a selected portion of the cable television band in a range of about 45 MHz to about 130 MHz.

In the standard FM broadcast band, there are fifty 400 KHz channels available. Thus, although up to fifty distinct audio channels 30 could be provided in the FM radio band, it is preferable to provide only up to 25 channels of digitized audio material in alternate (every other) channels in the standard FM band. In order to expand the number of audio channels that can be provided in a CATV system, the present invention makes it possible to utilize other portions of the cable spectrum. In particular, by providing each channel of digital audio data as a narrowband signal (e.g., 400 KHz), portions of the CATV spectrum previously thought unusable (due to factors such as group delay caused by the large number of distribution amplifiers and corresponding filters in the distribution network) can be used to carry the audio data. One such portion of the CATV spectrum is the 45 MHz to 54 MHz band below television channel two that suffers particularly severe group delay, due to the filtering required to separate the forward transmission path above 50 MHz from the return path between 5 MHz and 30 MHz.

The digitized audio signals from the audio channels are provided from the subscriber cable drop 18 to a digital receiver 38, which is described in greater detail hereinafter with respect to FIGS. 3A and 3B. As with the "special" TV channels, access to some or all of the digitized audio channels may be restricted by the use of address signals 26 which are imbedded in the multiplexed digital channel.

It is also possible to provide nondigitized audio source material over the cable 14. A channel 40 of audio source material 42 is provided to a conditioning circuit 44 to adjust the signal level of the source material. The conditioned audio source material is provided to an FM exciter 46 which provides the conditioned audio source material as a radio frequency signal to the cable 14. One channel 40 is illustrated, but several channels may be provided. As with the digitized channels 30, the RF output of each nondigitized channel 40 occupies 400 KHz. The nondigitized audio signals are transmitted via the cable in the 20 MHz FM band, and can be provided as nonspecial (nonaddress restricted) channels to the subscriber.

Advantageously, the nondigitized channels 40 can be interspersed in the FM radio band between the digitized channels 30. Alternatively, but less effectively, the digitized channels 30 can be assigned to a portion, such as the upper 10 MHz of the standard FM radio band while the nondigitized channels 40 reside in the lower 10 MHz of the standard FM band.

A combiner 48 combines the signal outputs of the TV channels 12, the address information 26, the digitized audio channels 30 and the nondigitized audio channels 40 onto the cable 14.

Figure 2:
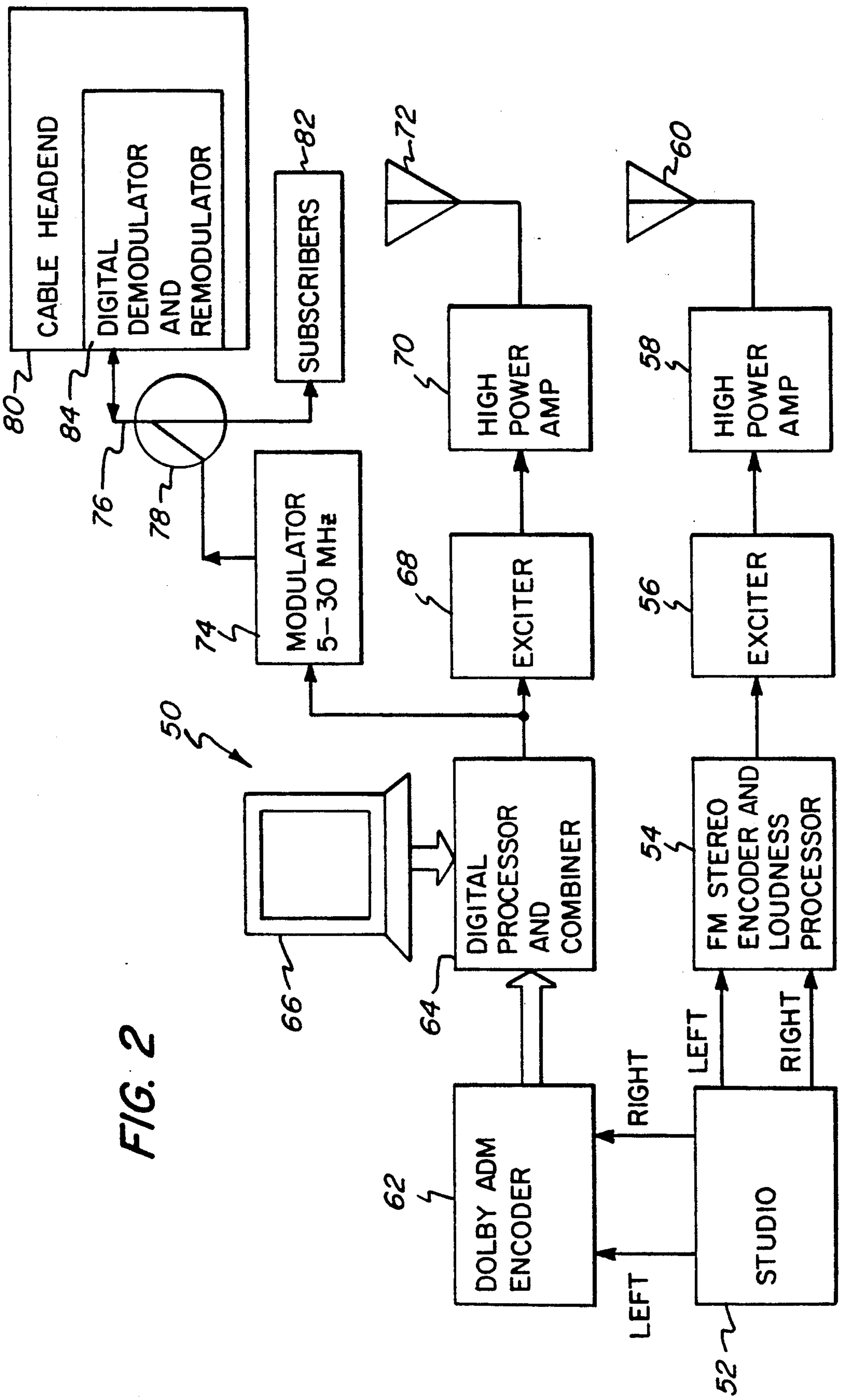
FIG. 2 is a schematic block diagram of a digital FM broadcast and cable interconnection system, according to the invention.

FIG. 2 shows an FM broadcast station 50 and cable interconnection system. A studio 52 provides audio source material (similar to elements 32, 42 of FIG. 1) as unprocessed audio signals in stereo along "left" and "right" signal paths.

In one instance, the audio signals are provided to an FM stereo encoder and loudness processor 54 (similar to element 44 of FIG. 1), and from there are provided to an FM exciter 56 (similar to element 46 of FIG. 1). The output of the exciter 56 is amplified by a high power amplifier 58 and broadcast over the airwaves by an antenna 60 as stereo multiplex (MPX) FM in the FM broadcast band.

In another instance, the audio signals are provided to a Dolby adaptive delta modulation (ADM) encoder 62, and from there are provided as a data stream to a digital processor and combiner 64. The digital processor and combiner 64 operates under the control of a text and control computer 66.

The output of the digital processor and combiner 64 is provided in one instance to an FM exciter 68, similar to the FM exciter 56. The output of the exciter 68 is amplified by a high power amplifier 70, similar to the amplifier 58, and broadcast over the airwaves by an antenna 72, similar or unitary with the antenna 60, as digital FM in the FM broadcast band for reception by a digital FM receiver, such as is disclosed in FIGS. 3A, 3B.

In another instance, the output of the digital processor and combiner 64 is provided as 8-level data to an FM modulator 74 which inserts the digitized audio signals onto a cable television transmission line 76 via a directional splitter 78 to a cable headend 80 (corresponding to element 10 of FIG. 1). Preferably, the digital audio signals are transmitted over the cable 76 at 5–30 MHz, which is reserved for return or "upstream" (to the headend) communication over the cable 76, and which is outside of the spectrums of both the audio channels (30 and 40 of FIG. 1) and television channels (12 of FIG. 1) that are provided by the headend 80 to subscribers 82.

In FIG. 2, the exciter 68 could as well be a QPSK modulator, and the modulator 74 could as well be a QPSK modulator.

In the arrangement shown in FIG. 2, the headend 80 is provided with a digital demodulator and remodulator 84 for receiving and demodulating the digitized audio signals from the off-site modulator 74 in the 5–30 MHz band, and for remodulating and transmitting digitized audio signals on the transmission line 76 in the FM band (88–108 MHz) or a selected portion of the cable band (e.g., 45–54 MHz) to subscribers 82. The techniques of providing "special" audio channels, as well as the spacings of digitized and nondigitized audio channels within the FM band, discussed with respect to FIG. 1, are equally applicable in the system of FIG. 2.

FIG. 2 contemplates that several stations 50 will provide digital audio channels, generally one channel per station, to the cable system operator (CSO) 80. As noted therein, this is readily accomplished over existing cable transmission lines 76 in a band (such as 5–30 MHz) reserved for upstream communication to the CSO. More details of the system are shown with respect to FIG. 7.

Figure 3A:
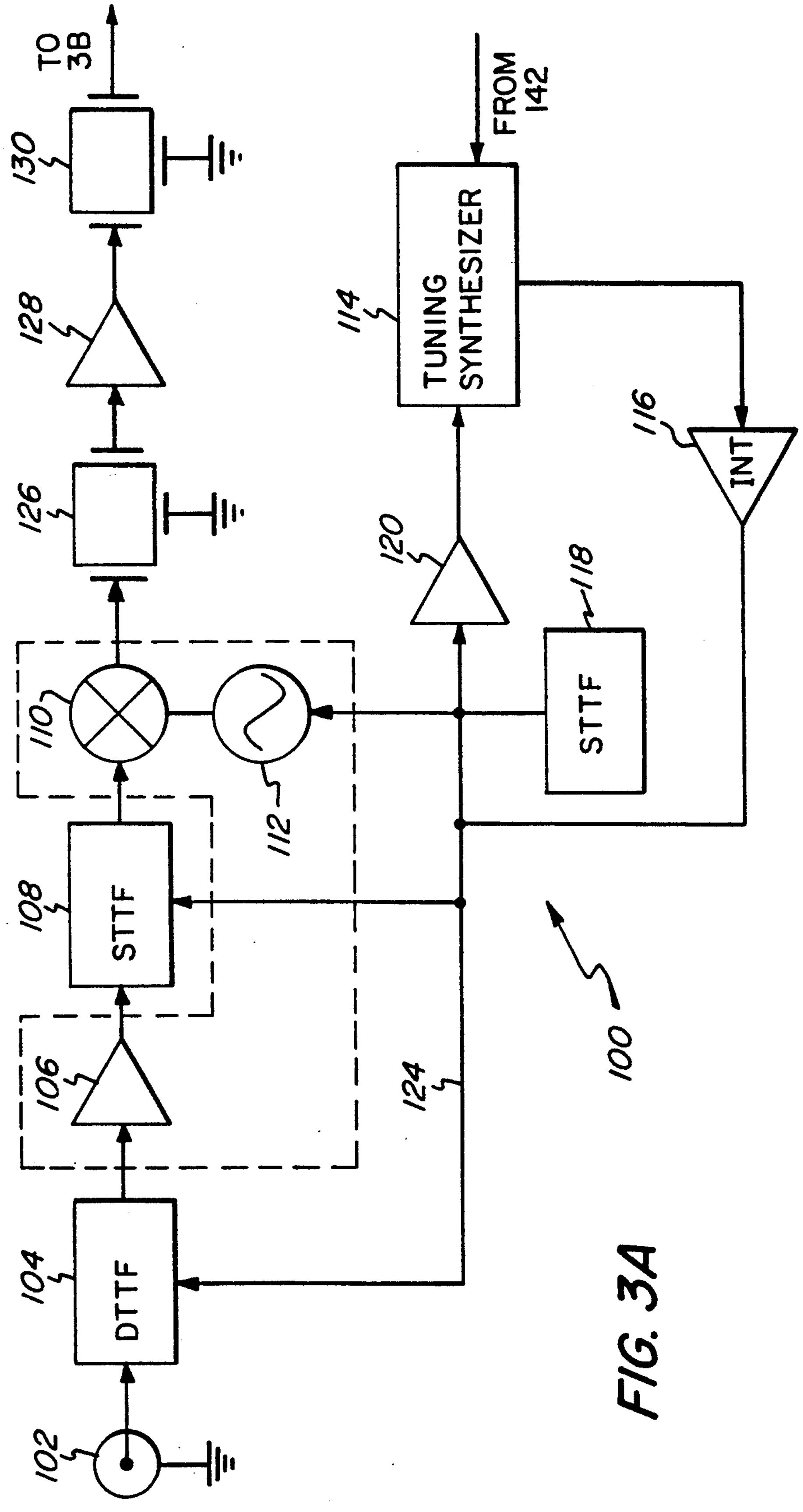
FIGS. 3A and 3B, combined, are a schematic block diagram of a digital FM receiver, according to the invention.
Figure 3B:
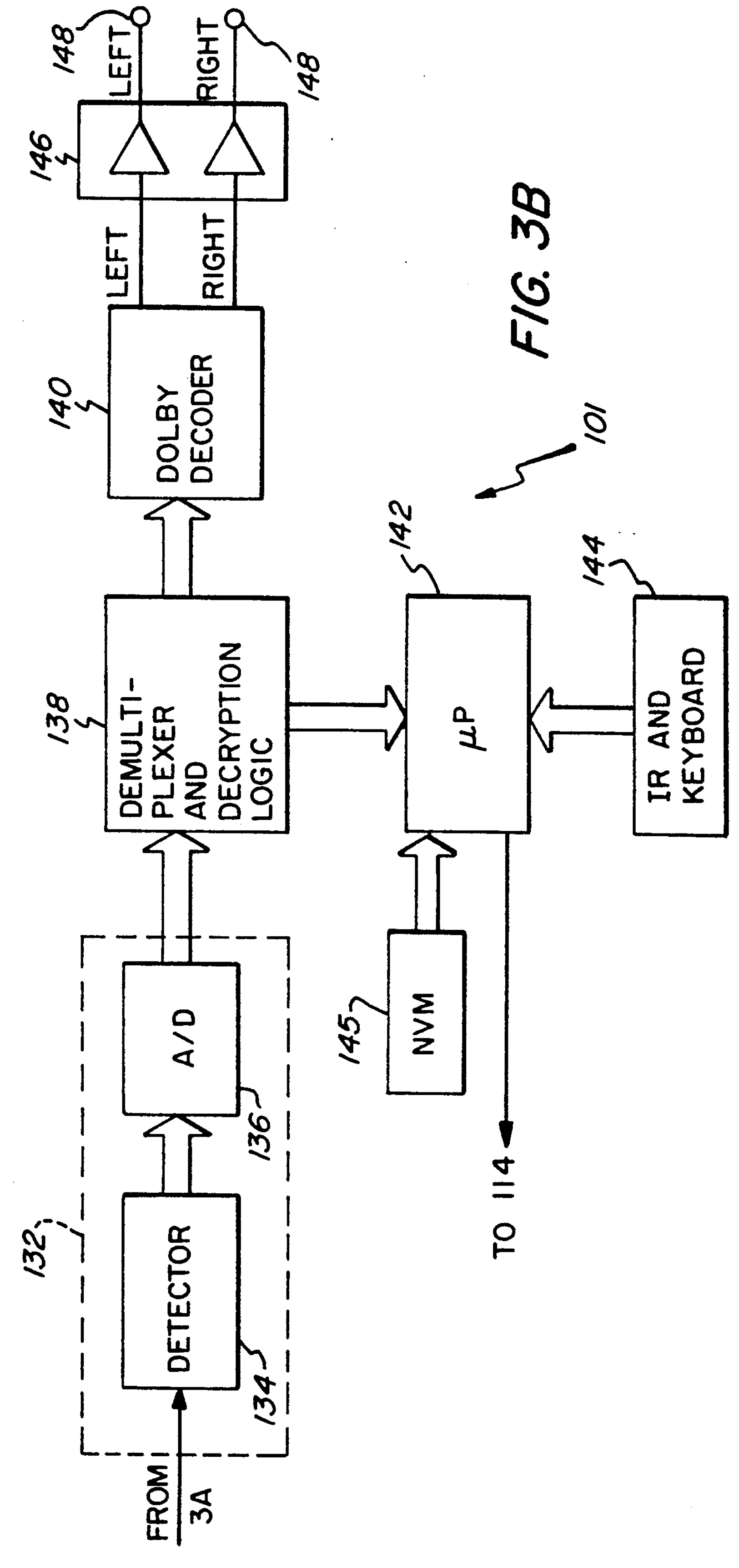

FIGS. 3A and 3B show a receiver for receiving the digital audio signals in the FM or cable bands. Generally, FIG. 3A shows a tuner section 100, and FIG. 3B shows a decoder section 101. The input 102 to the receiver is either a cable transmission line (14 of FIG. 1; 76 of FIG. 2), or a suitable antenna and preamplifier (not shown). It is contemplated in this example that the receiver will tune from about 45 MHz to 130 MHz, in an "expanded" cable audio band, to provide a large number of audio channels while avoiding the used TV channels.

The signals from the input 102 are provided to a double tuned tracking filter (DTTF) 104, from there to an amplifier 106, on to a single tuned tracking filter (STTF) 108, and to a mixer 110, according to known techniques. The mixer 110 receives a second input from an oscillator 112, so that the output of the mixer 110 is at an intermediate frequency (IF) of 10.7 MHz for a selected channel. The channel selection process is under control of a tuning synthesizer 114, integrating amplifier 116, STTF 118 and amplifier 120, interconnected as shown, and impressing an appropriate signal on a line 124 to the DTTF 104, STTF 108 and oscillator 112 to effect channel selection, according to known techniques.

The selected audio channel is provided at the intermediate frequency (IF) to a filter network comprising a bandpass filter 126, amplifier 128 and bandpass filter 130, as shown, according to known techniques, and is ready for detection.

In one embodiment of the invention, a detector 132 is provided which comprises an FM detector 134, such as a Sanyo LA1150, which provides an 8-level data output to an analog-to-digital (A/D) converter 136, such as a 4-bit CMOS device. The detector 132 is suitable for digital audio received in 8-frequency modulated FM format.

The output of the A/D device 136 is provided as a data stream over a bus to a demultiplexer and decryption logic circuit 138 which separates the data stream into control bits and channel indication (tag bits) and encrypted digital audio data bits (demultiplexing functions) and decrypts the digitized audio data into a suitable form for a Dolby decoder 140. The audio data is decrypted into three serial streams per audio channel consisting of basic delta modulation parameters for "left" and "right" channels and companding data streams for "left" and "right" channels.

The demultiplexed control and channel data separated out from the data stream by the element 138 are provided to a microprocessor ($\mu$P) 142 which controls the overall operation of the receiver. Channel selection is provided by an infrared (IR) receiver and/or a keyboard 144, which information is passed on by the microprocessor 142 to the tuning synthesizer 114. A unique address, or serial number for the receiver is stored in a nonvolatile memory (NVM) 145, for addressing by the CSO, as discussed with respect to FIG. 1.

The output of the Dolby decoder 140 is provided as "left" and "right" audio channels to a stereo amplifier 146, and to stereo outputs 148 for use with standard audio components. It is anticipated that a relay will be provided at the output 148 to switch between other source material (not shown) and the digital audio output of the receiver, to cover instances where a user's amplifier component has limited inputs available.

In an alternate embodiment, the detector 132 is a quadrature phase shift key (QPSK) detector. This, of course, presupposes that the digital modulation of audio data signals occurring, for instance at element 34 of FIG. 1 and element 64 of FIG. 2, occurs in the QPSK mode. It is apparent that reception of multilevel AM or FM modulated digital signals can suffer from multipath reception problems (reflections) when transmitted over the airwaves (see 72, FIG. 2) especially with respect to stereo transmissions. QPSK displays greater immunity to this problem.

QPSK techniques are well known, and are disclosed for instance in the aforementioned commonly-owned U.S. Pat. No. 4,821,097, which is incorporated herein by reference.

Figure 4:
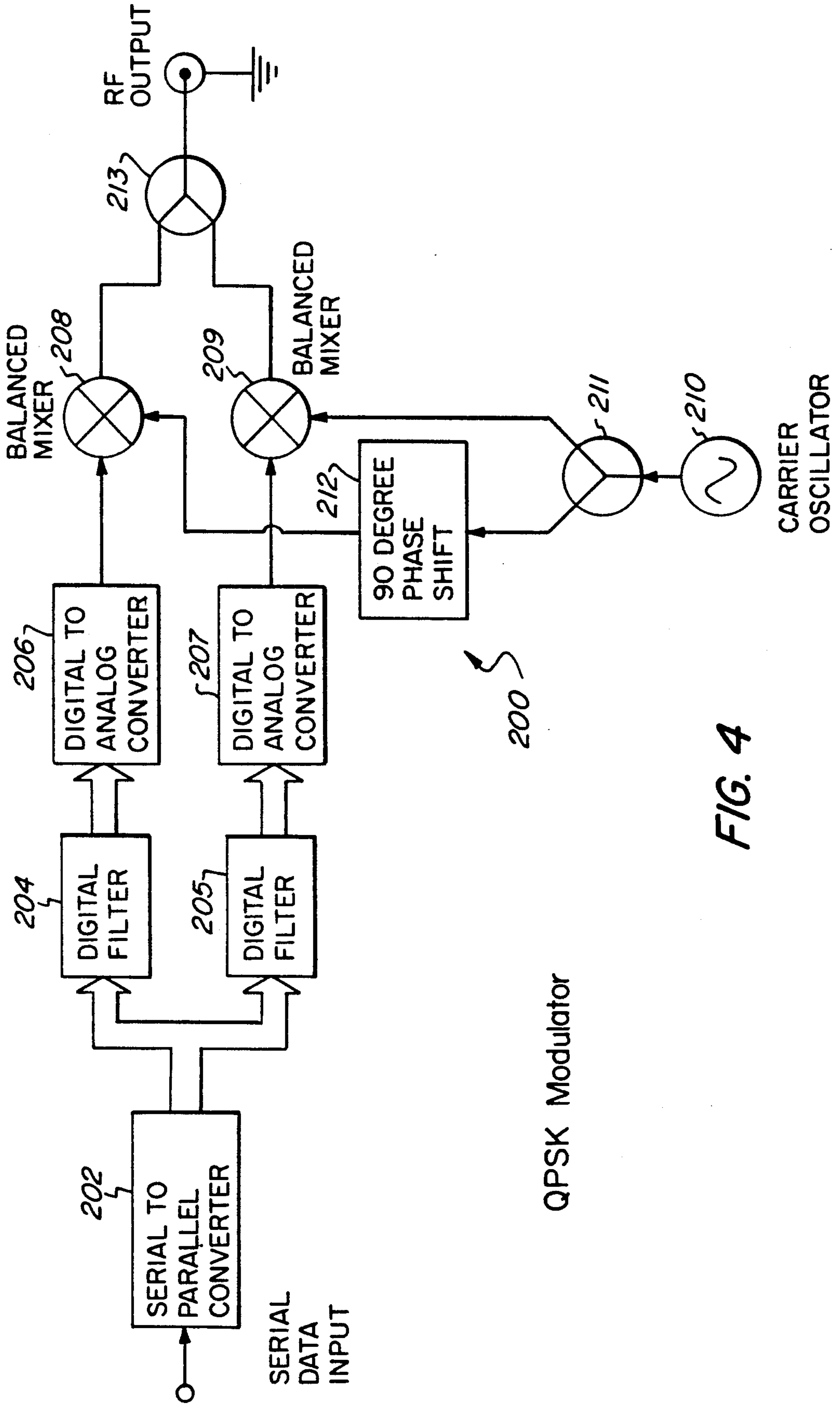
FIG. 4 is a schematic of a multiphase modulator suitable for use in the digital audio system of this invention.

FIG. 4 shows a multiphase modulator 200 that can be used to modulate the digital audio data, and is suitable for use as the FM cable band exciter 36 of FIG. 1. Serial data input is provided to a serial/parallel converter 202, filtered by two digital filters 204 and 205 and provided to two digital-to-analog converters 206 and 207, as shown. The output of each digital-to-analog converter 206 and 207 is provided to a balanced mixer 208 and 209, respectively. The output of a carrier oscillator 210, operating in the FM or selected portion of the cable television band, is split by a splitter 211 and provided, in one instance, to one of the mixers 209, and in another instance is phase shifted 90 degrees by a phase shifter 212 prior to being provided to the other mixer 208. The outputs of the two mixers are combined at a combiner 213, the output of which is digitized audio RF output in the FM or the selected portion of the cable television band. Multiphase modulation techniques are described in greater detail in the aforementioned U.S. Pat. No. 4,821,097 incorporated by reference herein.

Figure 5:
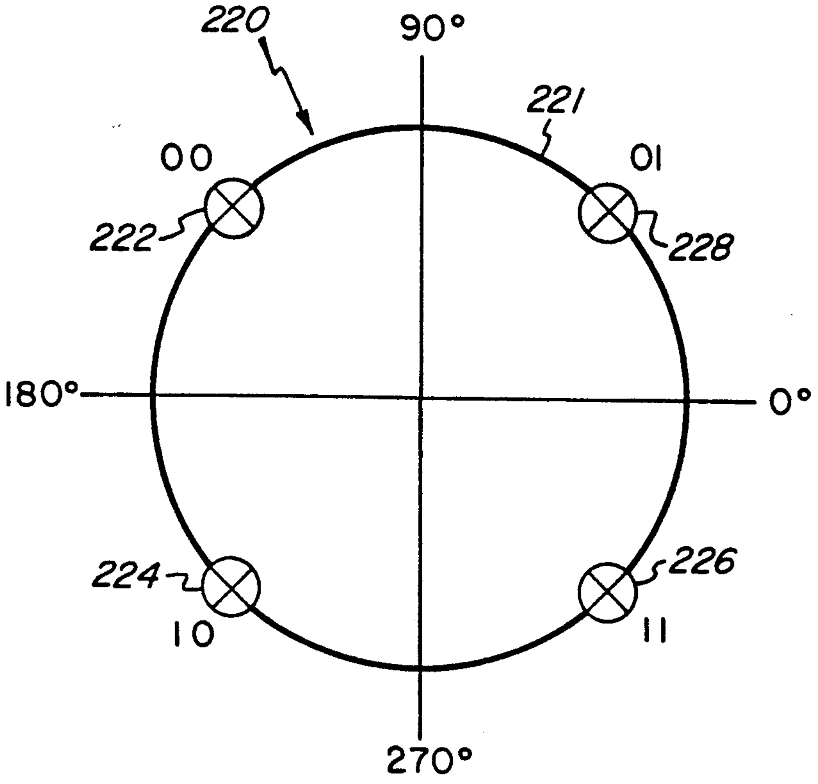
FIG. 5 is a polar diagram showing phase relationships for the multiphase modulator of FIG. 4.

As shown in the polar diagram 220 in FIG. 5, the audio data is modulated such that each two bit symbol appears 90 degrees apart on the axes of the polar diagram. The rightmost bit in each of the two bit symbols is shifted out of the transmitting shift register first, and into the receiving shift register first. There are four data points 222, 224, 226, 228 shown in polar diagram 220 on the circle 221 which represent the normal amplitude of the carrier signal.

Figure 6:
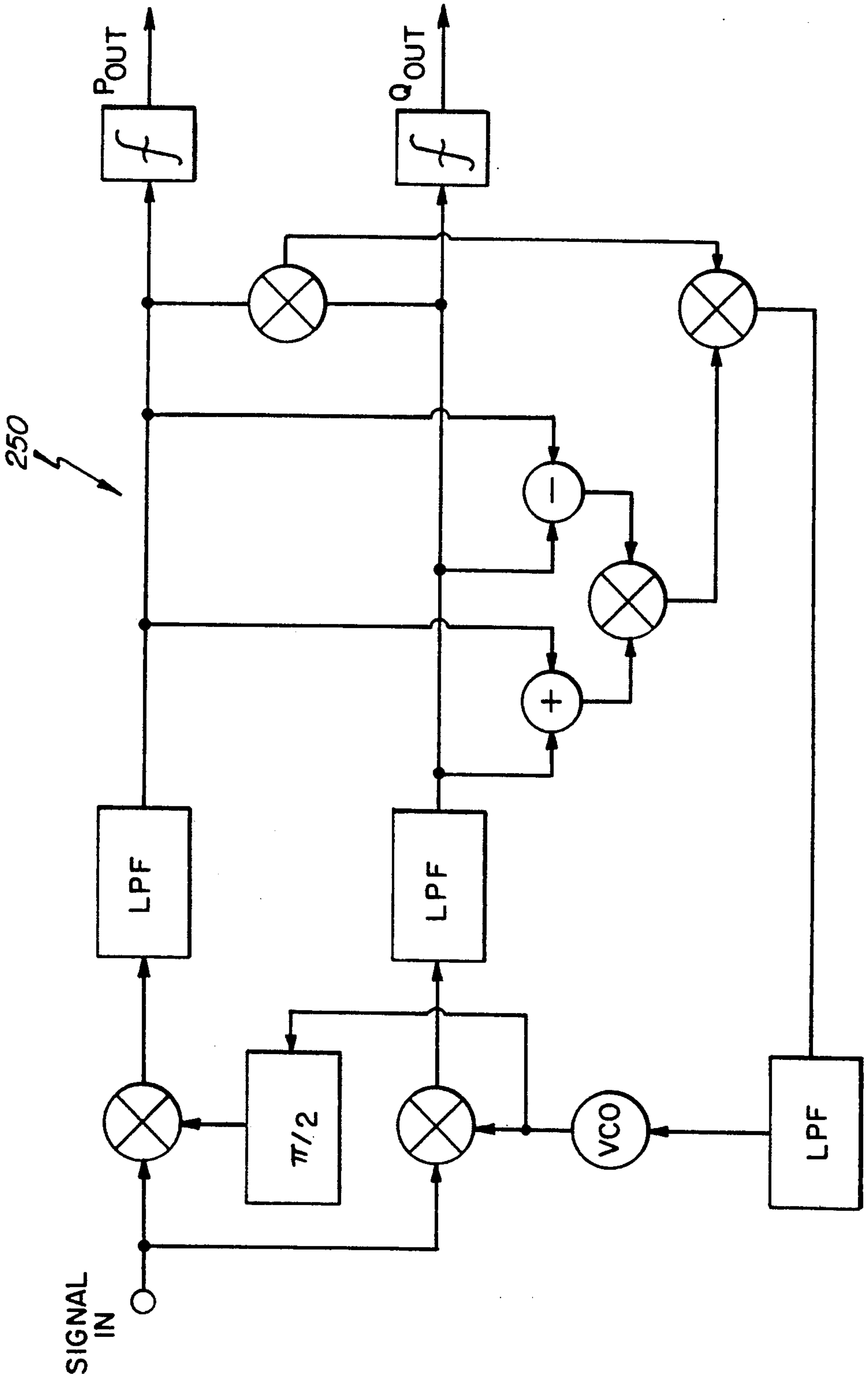
FIG. 6 is a schematic of a Costas loop QPSK detector suitable for use in the digital receiver of this invention.

FIG. 6 shows a known Costas loop carrier recovery system 250, which is suitable for decoding a QPSK signal according to known techniques. Such an arrangement could be advantageously employed as the detector 132 of FIG. 3B.

Figure 7:
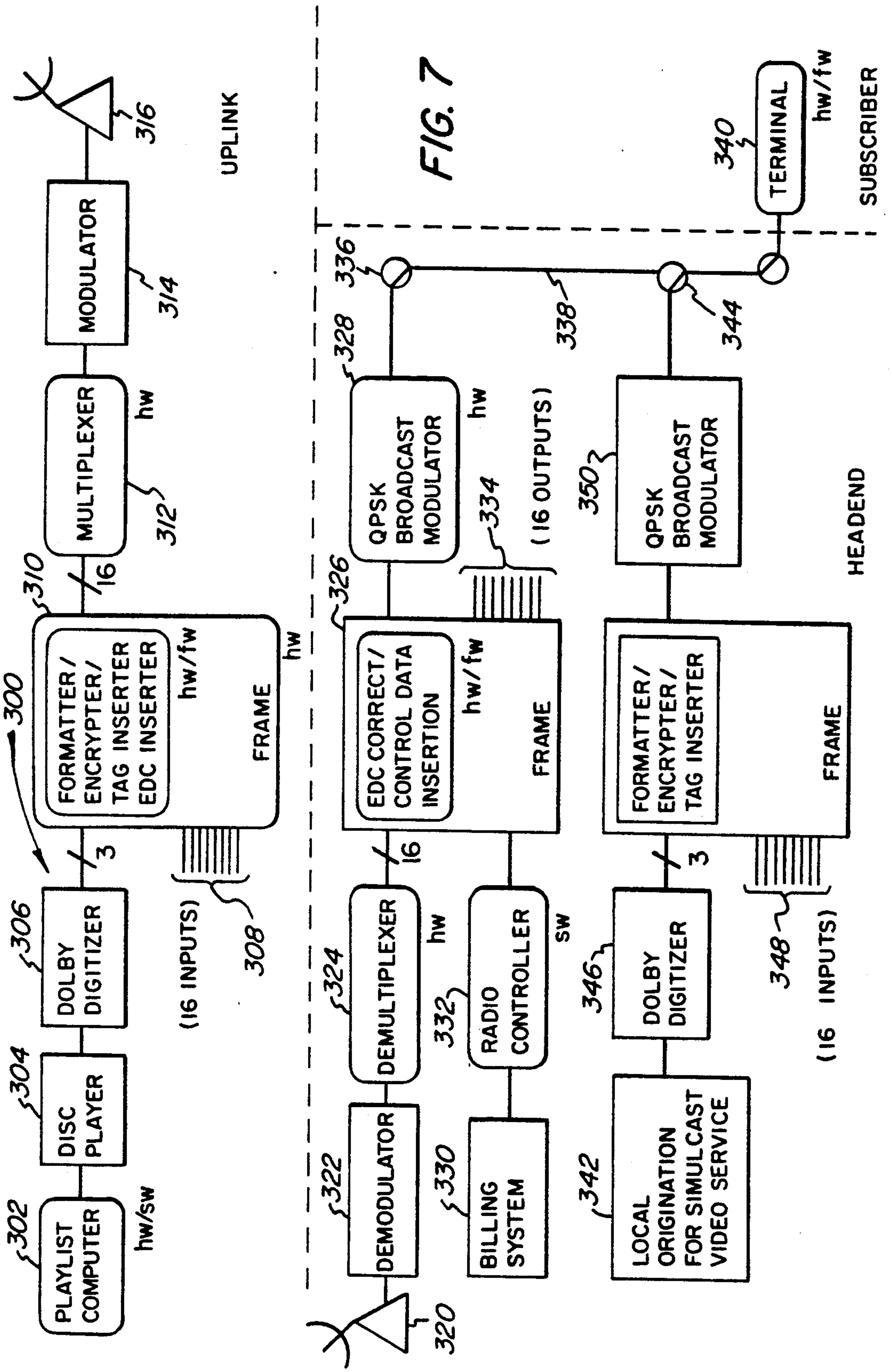
FIG. 7 is a schematic block diagram of a digital FM broadcast and cable interconnection system, according to the invention.

FIG. 7 shows a digital broadcast system 300. A playlist computer 302, for instance at a programmer's facility, controls the selection of audio source material from a disc player 304. The output of the disc player is digitized by a Dolby digitizer 306, and passed on as one of 16 inputs (channels) 308 to a formatter/encryptor/tag inserter/EDC inserter ("inserter") 310. The inserter 310 combines the digital audio output of the digitizer 306 with other source material, which may or may not be digital audio. The inserter 310 formats and encrypts the source material on each channel 308, tags it to identify a program access level, and provides error detection and correction (EDC) functions. The output of the inserter 310 is multiplexed by a multiplexer 312, modulated by a modulator 314 and transmitted over a single video satellite uplink 316.

At the receiving end, a satellite dish 320 receives the multiplexed output of the inserter 310, demodulates it at a demodulator 322, demultiplexes it at a demultiplexer 324 and provides it as a data stream to an EDC correct-/control data insertion device 326. Each of the 16 demultiplexed data streams is error corrected by the device 326 and provided to a QPSK broadcast modulator 328, such as that described above. A computerized billing system 330 exercises control over a radio controller 332, which is comparable to the address module 26 of FIG. 1 for permitting/restricting access to program material by subscribers. The address information from the radio controller 332 is inserted by the device 326 into the data streams.

As shown in FIG. 7, 16 individual outputs 334 of the device 326, each corresponding to a channel of source material, are provided to a QPSK modulator (one, 328 shown), and combined by a combiner 336 onto a transmission line 338 for distribution to subscribers (one shown) having an appropriate terminal 340.

Another beneficial feature of this system 300 is that locally (versus remotely, by satellite) originated audio source material 342, such as for simulcast with a television program, may be combined by a combiner 344 onto the transmission line. This would be achieved by digitizing the source material 342 with a digitizer 346, for each of a plurality of channels 348, providing the digitized source material to an inserter similar to the inserter 310 (but not requiring the EDC insertion function), and QPSK modulating the combined output thereof with a modulator 350 for broadcast on the transmission line 338. Although not shown, video channels could also be combined for broadcast over the line 338.

Figure 8:
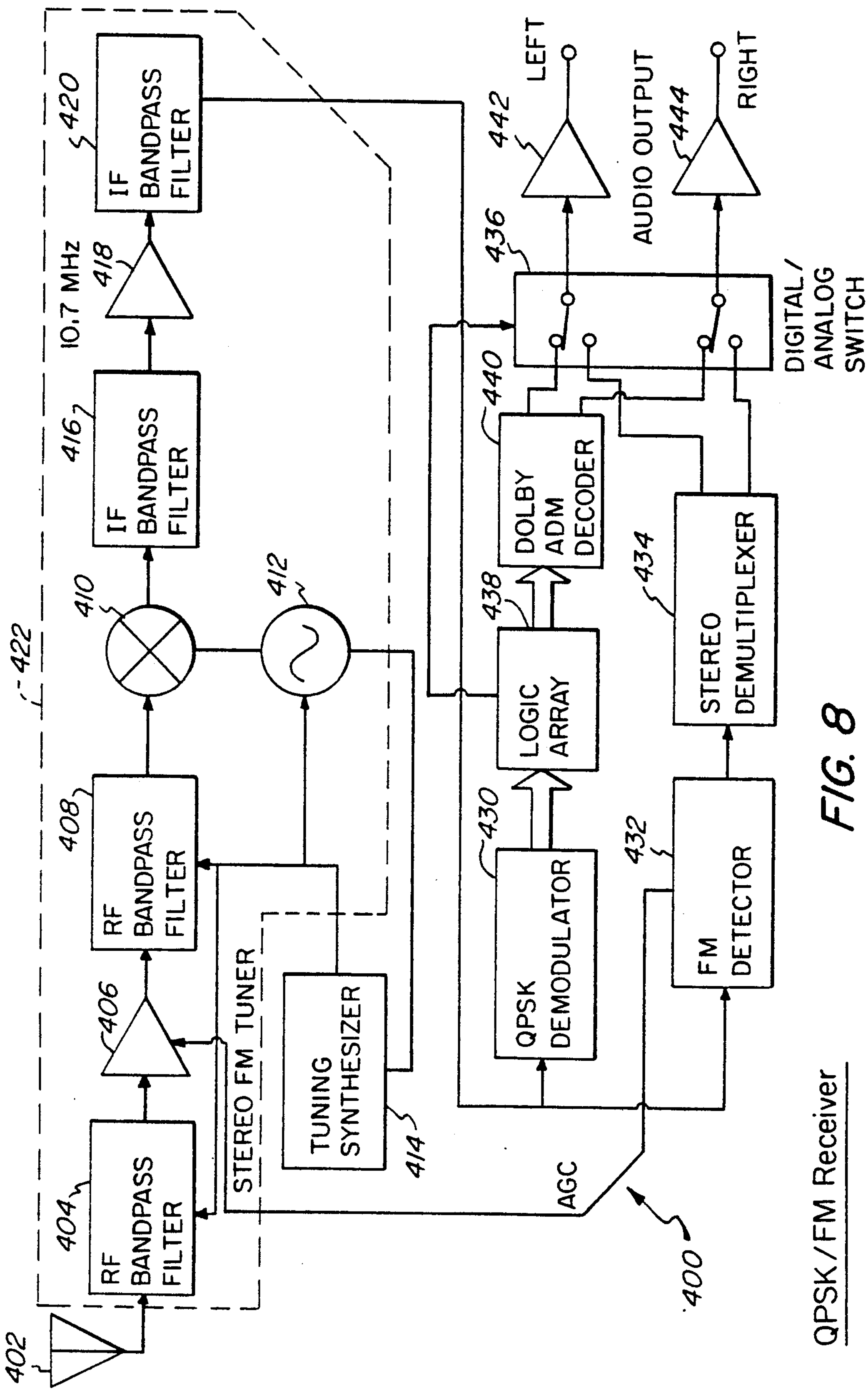
FIG. 8 is a schematic block diagram of a digital FM receiver, according to the invention.

FIG. 8 shows a digital FM/cable band receiver 400, similar in many respects to that shown and described with respect to FIGS. 3A and 3B. As will become evident, however, a notable difference is that the receiver 400 of FIG. 8 is suitable for receiving both QPSK digitized and nondigitized FM signals.

Signals received on an antenna 402 or from a cable drop (not shown) are provided to a tunable RF bandpass filter 404, to a variable gain amplifier 406, and to a tunable RF bandpass filter 408. The output of the RF bandpass filter 408 is provided to a mixer 410, which receives a second input from a variable frequency oscillator 412, so that the output of the mixer 410 is at an intermediate frequency (IF) for a selected channel. The channel selection process is under control of a tuning synthesizer 414 which receives the output of the variable frequency oscillator 412, and provides a signal based on the output of the oscillator 412 to effect channel selection by the RF bandpass filters 404 and 408. The output of the mixer 410 is provided to an intermediate frequency (IF) bandpass filter 416, tuned to 10.7 MHz, to an amplifier 418, and to a second IF bandpass filter 420 tuned to 10.7 MHz. The IF bandpass filters 416 and 420 are preferably wide type ceramic filters. The output of the second IF filter contains the signals received on the antenna 402 or from the cable drop corresponding to a selected channel in the FM or cable television band. A dotted line 422 encloses the elements 404, 406, 408, 410, 412, 416, 418 and 420, such as would be found in a standard FM tuner.

The output of the second IF bandpass filter 420 is provided to both a QPSK demodulator 430 and to an FM detector 432. In one signal path, the FM detector detects the audio component of the incoming signal and provides such as an AF signal to a stereo demultiplexer 434 (for stereo broadcasts), the output of which is provided to a digital or analog switch 436 as left and right audio channel signals. The FM detector 432 also provides a signal to the variable gain amplifier 406 to automatically control the gain thereof in accordance with known automatic gain control (AGC) techniques.

In another signal path, the QPSK demodulator provides a bit stream to a logic array 438, when there is a digital signal received in the selected channel. An indication of the existence of such a digital signal, indicative of a digitized audio broadcast being received, is provided as a logic signal to the digital analog switch 436. The output of the logic array 438 is provided to a Dolby ADM decoder 440, the output of which is provided to the digital analog switch 436 as left and right audio channel signals (for stereo broadcasts).

The analog/digital switch 436 selects between the outputs of the Dolby ADM decoder 440 and the stereo demultiplexer 434, under control of the logic array 438, and provides left and right audio signals from one or the other to audio amplifiers 442 and 444.

The advantages of the invention are multifaceted. As mentioned hereinbefore, the narrowband digitized audio channels can be provided in the FM radio band or in portions of the CATV spectrum heretofore considered unavailable for the transmission of audio data. When the digital audio is transmitted in the FM radio band, each channel can be interspersed between nondigitized audio channels, with each channel (digital or analog) occupying 400 KHz in the FM band. The Federal Communications Commission (FCC) requires at least 800 KHz between standard FM channels in a market, which translates into only 25 stations in the 88–108 MHz band. However, since digitized audio channels may be interspersed between standard (nondigitized) channels, up to 50 channels (stations) could be provided in the standard FM, 20 MHz wide band. This is highly pertinent to both airwave and cable transmission. Due to the availability of many more in the apparatus and method of the present invention, there is room created for original local stations, basic premium stations and "pay-per-listen" stations, all, in marked contrast to the aforementioned U.S. Pat. No. 4,684,981, without usurping a TV video channel.

Another advantage is that most of the degradation in analog radio signals carried over cable occurs within the cable network (transmission line) itself. This problem is overcome by the use of narrowband, 400 KHz bandwidth digitized audio channels as one-to-one replacements for the standard audio channels in the FM band and as additional channels in selected portions of the CATV spectrum that are not occupied with one or more television channel signals. The ultimate result is that listeners will be able to receive audio broadcasts that are more in line with digital disc (CD) recordings which are becoming so popular. Further, the possibility of providing high quality audio via cable may add a new impetus to the radio industry.

What is claimed is:

1. A method of broadcasting audio signals, comprising the steps of:

digitizing a channel of audio source material to produce a compressed digital data stream;

modulating a carrier with said data stream using multilevel modulation to produce a narrowband RF channel signal having a bandwidth of no more than about 400 KHz and a frequency within a range of about 45 MHz to about 54 MHz; and transmitting the RF channel signal over a cable television system within a band extending from about 45 MHz to about 54 MHz.

2. A method in accordance with claim 1, wherein said multilevel modulation comprises at least one of multiamplitude, multiphase, and multifrequency modulation.

3. A method in accordance with claim 1, wherein:

a plurality of channels of audio source material is digitized at said digitizing step;

said plurality of channels are modulated using multilevel modulation at said modulating step to produce a plurality of narrowband digital RF channel signals, each having a bandwidth of no more than about 400 KHz; and said plurality of digital RF channel signals are transmitted at said transmitting step, each in a channel allocation of no more than 400 KHz.

4. A method in accordance with claim 1 wherein said channel of audio source material comprises a plurality of separate audio signals for transmission together in said channel allocation of no more than 400 KHz.

5. A method in accordance with claim 4 wherein said separate audio signals are left and right stereo channel signals.

6. A method of rebroadcasting audio signals received from a program source via a cable television transmission line, comprising the steps of:

receiving audio source material via a cable television transmission line in a band extending from about 5 MHz to about 30 MHz;

processing said audio source material to produce a compressed digital data stream;

modulating a carrier with said data stream using multilevel modulation to produce an RF channel signal having a bandwidth of no more than about 400 KHz and a frequency within a range of about 45 MHz to about 54 MHz; and transmitting the RF channel signal in a band extending from about 45 MHz to about 54 MHz over said cable television transmission line.

7. A method in accordance with claim 6, wherein said multilevel modulation comprises at least one of multiamplitude, multiphase, and multifrequency modulation.

8. A method in accordance with claim 6, comprising the further step of:

transmitting said RF channel signal over the airwaves simultaneously with the transmission thereof on said cable television transmission line.

9. A method in accordance with claim 6, wherein:

a channel of analog audio source material is received at said receiving step;

a channel of digital audio source material is received at said receiving step;

said processing and modulating steps are performed on the digital channel of audio source material; and said transmitting step transmits the processed and modulated digital channel in a first channel allocation within said band extending from about 45 MHz to about 54 MHz and transmits the analog source material in analog form in a second channel allocation within the FM radio broadcast band.

10. Apparatus for receiving digital and analog audio signals comprising:

tuner means for tuning to signals transmitted on a cable television system in a first band extending from about 45 MHz to about 54 MHz and a second band comprising the FM radio broadcast band;

digital demodulator means for demodulating a multilevel modulated, compressed digitized audio signal transmitted in a channel allocation of no more than 400 KHz in said first band and output from said tuner;

decoder means for processing the demodulated compressed digitized audio signal to provide an audio output signal; and analog demodulator means for demodulating a nondigitized audio signal transmitted in a channel allocation of about 400 KHz in said second band and output from said tuner to provide an audio output signal.

11. Apparatus in accordance with claim 10 further comprising:

means for determining when a signal tuned by said tuner contains digitized audio source material; and switch means responsive to said determining means for selectively outputting an audio output signal from said digital demodulator means or said analog demodulator means depending on whether a tuned signal contains digitized or nondigitized source material.

12. A radio receiver for providing reproduction of audio signals transmitted as digital data in a portion of a cable television band extending from about 45 MHz to about 54 MHz comprising:

a tuner for receiving compressed digital audio signals in channel allocations of no more than about 400 KHz in said cable television band portion;

digital demodulator means coupled to an output of said tuner for demodulating a multilevel modulated, compressed digital audio signal received in said cable television band portion; and decoder means, coupled to receive demodulated compressed digital audio data from said digital demodulator means, for converting the data to an analog audio signal.

13. A radio receiver in accordance with claim 12, wherein said decoder means comprises an adaptive delta modulation decoder.

14. Apparatus for broadcasting audio signals, comprising:

means for digitizing a plurality of channels of audio source material to produce a plurality of compressed digital data streams;

means, coupled to said digitizing means, for modulating a plurality of RF carriers with said data streams using multilevel modulation to produce a plurality of digital RF channel signals, each having a bandwidth of no more than about 400 KHz and a frequency within a range of about 45 MHz to about 54 MHz; and means, coupled to said modulating means, for transmitting the digital RF channel signals in a portion of a cable television band extending from about 45 MHz to about 54 MHz.

15. Apparatus in accordance with claim 14, wherein said multilevel modulation comprises at least one of multiamplitude, multiphase and multifrequency modulation.

16. Apparatus in accordance with claim 14 wherein each of said channels of audio source material comprise a plurality of separate audio signals for digital transmission together in a channel allocation of no more than about 400 KHz within said cable television band portion.

17. Apparatus in accordance with claim 14 wherein at least one of said channels of audio source material comprises left and right stereo channel signals for digital transmission together in a channel allocation of no more than about 400 KHz within said cable television band portion.

18. Apparatus in accordance with claim 14 further comprising:

means for encrypting said digital data streams.

19. Apparatus in accordance with claim 18, wherein said digitizing means comprise an adaptive delta modulation encoder.

20. A radio receiver for providing reproduction of audio signals transmitted as digital data in the cable television band comprising:

a tuner for receiving compressed digital audio signals transmitted over a cable television transmission line in narrowband channel allocations of no more than about 400 KHz in a portion of the cable television spectrum extending from about 45 MHz to about 130 MHz;

digital demodulator means coupled to an output of said tuner for demodulating a multilevel modulated, compressed digital audio signal received in said portion of the cable television spectrum; and decoder means, coupled to receive demodulated compressed digital audio data from said digital demodulator means, for converting the data to an analog audio signal.

* * * * *